United States Patent
Allezy et al.

(10) Patent No.: US 10,054,071 B2
(45) Date of Patent: Aug. 21, 2018

(54) METHOD OF OPERATING AN INTERNAL COMBUSTION ENGINE

(71) Applicant: DELPHI TECHNOLOGIES IP LIMITED, St. Michael (BB)

(72) Inventors: Pierre Allezy, Messancy (BE); Noureddine Guerrassi, Vineuil (FR); Matthieu Goy, Strassen (LU); Alessio Ghirlanda, Mamer (LU)

(73) Assignee: DELPHI TECHNOLOGIES IP LIMITED (BB)

( * ) Notice: Subject to any disclaimer, the term of this patent is extended or adjusted under 35 U.S.C. 154(b) by 599 days.

(21) Appl. No.: 14/044,925

(22) Filed: Oct. 3, 2013

(65) Prior Publication Data
US 2014/0109873 A1   Apr. 24, 2014

(30) Foreign Application Priority Data
Oct. 23, 2012  (EP) ..................... 12189607

(51) Int. Cl.
*F02D 41/00* (2006.01)
*F02D 41/40* (2006.01)

(52) U.S. Cl.
CPC ....... *F02D 41/0047* (2013.01); *F02D 41/403* (2013.01); *Y02T 10/44* (2013.01); *Y02T 10/47* (2013.01)

(58) Field of Classification Search
CPC .... F02D 41/403; F02D 41/0047; Y02T 10/44; Y02T 10/47
See application file for complete search history.

(56) References Cited

U.S. PATENT DOCUMENTS

| 6,053,150 A * | 4/2000 | Takahashi | F02D 41/2438 123/300 |
| 6,112,716 A * | 9/2000 | Tachibana | F02D 41/0255 123/299 |
| 7,136,743 B2 | 11/2006 | Peltier | |
| 7,647,161 B2 * | 1/2010 | Haraguchi | F02D 35/028 123/299 |

(Continued)

FOREIGN PATENT DOCUMENTS

WO   2011073147 A1   6/2011

*Primary Examiner* — Hung Q Nguyen
*Assistant Examiner* — Brian P Monahon
(74) *Attorney, Agent, or Firm* — Joshua M. Haines (57) ABSTRACT

A method of operating an internal combustion engine, wherein the engine is operated in an injector learning mode in which an injection parameter associated with a nominal fuel quantity of a pilot injection is learned, includes performing a learning pilot injection based on a candidate value for the injection parameter to influence injection of the nominal fuel quantity and determining a parameter indicative of the actually injected fuel quantity based on the in-cylinder pressure during combustion of the learning pilot injection. The learning pilot injection is operated at an early timing such that combustion thereof complete occurs within a learning window positioned before combustion TDC and before the next combustion starts. The pressure is measured over the learning window, so that the determination of the parameter indicative of the actually injected fuel quantity takes into account essentially the entire combustion event of the learning pilot injection.

13 Claims, 5 Drawing Sheets

(56) References Cited

U.S. PATENT DOCUMENTS

| | | | | |
|---|---|---|---|---|
| 2002/0124828 A1* | 9/2002 | Shirakawa | ............ | F02D 41/005 |
| | | | | 123/299 |
| 2003/0164166 A1* | 9/2003 | Takeuchi | ............ | F02D 41/0085 |
| | | | | 123/674 |
| 2003/0233997 A1* | 12/2003 | Kawaguchi | ......... | F02D 41/0085 |
| | | | | 123/299 |
| 2004/0267433 A1* | 12/2004 | Asano | ................... | F02D 41/123 |
| | | | | 701/104 |
| 2005/0092298 A1* | 5/2005 | Asano | ................ | F02D 41/0007 |
| | | | | 123/435 |
| 2005/0092303 A1* | 5/2005 | Oki | .................... | F02D 41/0087 |
| | | | | 123/480 |
| 2009/0055083 A1* | 2/2009 | Sasaki | .................. | F02D 35/024 |
| | | | | 701/104 |
| 2009/0151697 A1* | 6/2009 | Hatano | ................ | F02D 35/023 |
| | | | | 123/435 |
| 2009/0292447 A1* | 11/2009 | Yamaguchi | ........... | F02D 35/023 |
| | | | | 701/103 |
| 2010/0305836 A1* | 12/2010 | Okada | ................ | F02D 41/2438 |
| | | | | 701/106 |
| 2010/0312454 A1* | 12/2010 | Nada | .................... | F02D 41/403 |
| | | | | 701/103 |
| 2011/0180039 A1* | 7/2011 | Nada | ...................... | F02D 35/02 |
| | | | | 123/445 |
| 2011/0192372 A1* | 8/2011 | Guglielmone | ........ | F02D 41/401 |
| | | | | 123/294 |
| 2011/0276255 A1* | 11/2011 | Haskara | ............... | F02D 35/023 |
| | | | | 701/105 |

* cited by examiner

METHOD OF OPERATING AN INTERNAL COMBUSTION ENGINE

CROSS REFERENCE TO RELATED APPLICATIONS

This application claims the benefit of European Patent Application No. 12189607.0 filed on 23 Oct. 2012, the entire disclosure of which is hereby incorporated herein by reference.

FIELD OF THE INVENTION

The present invention generally relates to the operation of internal combustion engines and in particular to fuel injection in such engines. More specifically, the present invention concerns the learning of pilot fuel injections.

BACKGROUND OF THE INVENTION

The contemporary design of internal combustion engines must cope with the increasingly stringent regulations on pollutant emissions. Accordingly, automotive engineers strive for designing engines with low fuel consumption and low emission of pollutants, which implies including electronic devices capable of monitoring the combustion performance and emissions in the exhaust gases.

A proper operation of a fuel-injected engine requires that the fuel injectors and their controller allow for a timely, precise and reliable fuel injection. Indeed, it is well known that problems arise when the performance, or more particularly the timing, and the quantity of fuel delivered by the injectors diverge beyond acceptable limits. For example, injector performance deviation or variability will cause different torques to be generated between cylinders due to unequal fuel quantities being injected, or from the relative timing of such fuel injection.

In order to take into account the flow specificities of a fuel injector, it has been proposed to associate to a given fuel injector a number of performance parameters thereof. These performance parameters are, e.g., encoded in a bar code applied to the injector, so that the flow performance parameters can be retrieved by a bar code scanner at the time of installation in the engine and transferred to the engine control unit (ECU). Such method for fuel injector parameters installation is for example described in U.S. Pat. No. 7,136,743.

Another method of fuel injector installation has been disclosed in WO2011/073147, which uses a segmented master flow curve (fuel quantity vs. pulse width, i.e. injector actuation time). Each fuel injector to be installed in the engine is provided with specific fuel injector parameters in a machine-readable format, and these parameters are transferred to the engine ECU. Fitting information, preferably coefficients for a characteristic equation attributed to each respective segment of the master flow curve, are contained in these fuel injector specific parameters.

It may be further noted that the problem of injector variability is particularly acute when injecting small fuel quantities. Therefore, fuel injector behavior in the so-called "ballistic" domain has been studied in detail.

A first approach in the reliable injection of small fuel quantities is to take into account injector response delays at opening and closing.

Besides, in order to take into account the drift of fuel injectors due to ageing, learning strategies have been developed to detect the injector specific "minimum drive pulse" (MDP), i.e. the minimum injector actuation time required for the smallest injection amount to occur. It may be noted that the length of an injector drive pulse, which influence the injector open time, is herein referred to as pulse width (PW). Commonly used strategies for determining the MDP are APC (accelerometer pilot control) and speed pilot control (SPC).

APC relies on the detection of the start of the combustion by means of a knock sensor. A pilot injection is set in a particular condition in such a way as to give a detectable signal about a known timing. The pilot fuel quantity is progressively increased until the fuel starts burning. The corresponding noise is detected and processed to compute the MDP.

The MDP detection by the SPC strategy relies on an increase of average speed due to the learning pilot injection, whereby a difference of speed exists between two consecutive injector events of the learning injector and the previous injector. The MDP is then detected as pulse width for which the speed difference exceeds a predetermined threshold.

Hence, while modern diesel injection strategies use a pilot injection, before the main injection, to reduce knocking, the efficiency of this pilot injection still depends on the accuracy of the injected fuel quantity. It is therefore desirable to be capable of properly controlling pilot injections, which implies monitoring the pilot fuel combustion.

US 2009/0292447 discloses a method for controlling fuel combustion in an internal combustion engine, wherein fuel injection is divided in a main injection and a pilot injection in advance of the main. The engine controller determines an amount of heat release based on the pilot injection, and corrects the fuel injection amount of the pilot injection based on the determined amount of heat release. As it is known in the art, the amount of heat release is proportional to the injected fuel quantity and can be determined from the in-cylinder pressure during combustion.

As a matter of fact, US 2009/0292447 discloses a closed-loop control of the pilot injection based on the amount of heat release. The control is thus made such that the amount of heat release based on the pilot converges to a target value. However, the approach described in US 2009/0292447 appears to be difficult to implement in practice, in particular where modern emission reduction strategies seek to minimize the time intervals between injected amounts within a same combustion cycle. Accordingly, when there are e.g. 3 injections (two pilots and one main) within an engine combustion cycle, the respective combustion events tend to overlap and determining the pilot contribution is difficult.

SUMMARY OF THE INVENTION

The present invention concerns a method of operating an internal combustion engine comprising at least one cylinder equipped with a pressure sensor, wherein, the engine is operated in an injector learning mode (thus generally switching from another, regular combustion mode). The learning mode may be selectively triggered, provided enabling conditions are met, with the goal of learning an injection parameter associated with a nominal fuel quantity of a pilot injection. The injector learning mode relies on the following learning routine: a learning pilot injection is performed based on a candidate value for said injection parameter to influence injection of the nominal fuel quantity; and a parameter indicative of the actually injected fuel quantity is determined based on the in-cylinder pressure during combustion of the learning pilot injection.

It shall be appreciated that the learning pilot injection is operated at an early timing such that combustion thereof is substantially complete before the next combustion starts, e.g. a main combustion or a second pilot (pre-main) injection. In particular, the learning pilot injection is preferably operated so that combustion thereof is substantially complete before the combustion top dead center (TDCC).

It shall be further noted that the determination of the parameter indicative of the actually injected fuel quantity based on the in-cylinder pressure takes into account essentially the entire combustion event of the learning pilot injection.

In other words, the present invention proposes a method in which small fuel injections, e.g. pilot pulses and the MDP, are learned during a learning mode, wherein the injected learning pulse is operated at a calibrated timing so that combustion thereof does not overlap with another combustion in the same combustion cycle. For this purpose, the injection timing of the learning pilot injection will generally be earlier than a pilot injection timing in a regular combustion mode (where the timing and fuel amounts are optimized for the current engine operating point). Also, the combustion of the learning pilot injection will normally be complete before TDCC, since the combustion of a main pulse will normally start close to TDCC.

In practice, the present method preferably employs for each learning pilot injection, i.e. each measurement routine, a predefined learning time window, positioned before TDCC, that is calibrated in function of the learning pilot injection so that the combustion of the latter occurs entirely in this learning window. The measurement of the in-cylinder pressure is then conveniently performed over this learning window (generally defined as crank angle range/interval). The learning window may be positioned in the crank angle (CA) range $-35°$ to TDCC (also noted $0°$), more preferably about $-20°$ C.A to $0°$ C.A. The width of the learning window may be adapted to the position of the pilot injection, but may typically have an angular width varying from $5°$ to $20°$ C.A.

In general, the present method can be used to control and correct an injection parameter, by comparing the measured parameter indicative of the actually injected fuel quantity to a target value or range, and updating or correcting the injection control parameter based on the result of said comparison.

Conveniently, the measured parameter indicative of the actually injected fuel quantity is the amount of heat release, which is widely used as indicator of injected fuel quantity. Hence, one may compare the measured amount of heat release with a target value or range of heat release. Since a measured amount of heat release can be readily converted in fuel quantity, and vice-versa, one may in fact easily convert either a measured heat amount or a nominal fuel quantity into the desired dimension, to perform the comparison on the fuel quantities (e.g. mg) or on the heat amounts (e.g. Joules).

Preferably, a baseline pressure measurement is performed over the learning window in a work cycle without any combustion in the learning window, before a learning injection is made, in order to take into account heat losses at the engine walls and more accurately compute the parameter indicative of the injected fuel quantity, respectively the corresponding amount of heat release.

Advantageously an ending baseline pressure measurement is similarly performed over the learning window in a work cycle without pilot combustion in the learning window, after the determination of the parameter indicative of the injected fuel quantity. Accordingly, an update or correction of an injection parameter, in particular a pulse width or pulse width correction factor, is carried out only in case the starting and ending baseline measurements are substantially similar. This allows checking the stability of the measurement point.

The learning mode is preferably considered enabled when one or more of the following conditions are met: the engine is warm, having preferably reached a temperature of at least $50°$ C.; the current EGR rate is low, preferably no more than 30%, more preferably not more than 10%; the engine is in a speed range between 1 000 and 3500 RPM.

Advantageously, a scheduler function controls the learning of the injection parameter for various pilot fuel quantities, including a minimum delivery pulse, in a predetermined sequence, and preferably for various rail pressures.

In a preferred embodiment, the following scheme is performed for each pilot injection to be learned:

b1) performing a learning pilot injection with a first candidate value for the injection parameter in one or more respective engine work cycles and determining the corresponding pressure-based parameter indicative of the actually injected fuel quantity, and comparing the latter to a target value or threshold associated with the nominal fuel quantity;

in case the comparison is not on target:

b2) performing a learning pilot injection with a different, second candidate value (preferably based on an offset mapping depending on rail pressure) for the injection parameter in one or more respective work cycles and determining the corresponding pressure-based parameter indicative of the actually injected fuel quantity, and comparing the latter to the target value or threshold;

in case the comparison is not on target:

b3) performing a learning pilot injection with a third candidate value for the injection parameter, preferably interpolated based on the first and second candidate values, in one or more respective work cycles and determining the corresponding pressure-based parameter indicative of the actually injected fuel quantity, and comparing the latter to the target value or threshold;

wherein as soon as a comparison is on target, the corresponding candidate value is used for learning said injection parameter in association with said nominal fuel quantity.

It may be noted that this test in three sub-steps allows a rapid converging towards the target, in particular due to the combination of the offset mapping and of the interpolation of candidate values.

A further appreciable aspect of the present invention is that it allows learning pilot injections in a foot-off phase, but also while there is a torque request.

Indeed, whereas the present method uses an earlier timing for the learning pilot injections, it is however compatible with a foot off phase. The main and possible pre-main injections are however operated so that their combustion does not occur within the learning window. This intrusive learning mode may be compensated by adjusting the respective timings and amounts of the pilot and main, as compared to the values calibrated for the regular operating modes. Also, when learning mode is operated in a foot-on phase, the pre-main and main injections are preferably corrected to provide a torque substantially identical to the torque that would be obtained in a regular combustion mode, at the same engine operating point (speed/load).

In case the learning mode is operated during a foot-off phase, then there is no need for a pre-main or main injection.

The above and other preferred embodiments are recited in the appended dependent claims.

According to another aspect, the present invention also concerns an engine control unit for an internal combustion engine that is configured to implement the above-described method.

BRIEF DESCRIPTION OF THE DRAWINGS

The present invention will now be described, by way of example, with reference to the accompanying drawings, in which.

DETAILED DESCRIPTION OF A PREFERRED EMBODIMENT

The present method will now be described, by way of example, with respect to the operation of a diesel reciprocating engine (4-stroke internal combustion engine) of a four-wheeled vehicle. As it is well known, such engine may typically comprise a cylinder block with one or more cylinders, each having a piston slideably received therein. The pistons are operatively connected to a common output shaft formed by a crankshaft equipped with a flywheel. Fuel is introduced into the combustion chambers of the respective cylinders to be combusted and thus reciprocate the four pistons in sequence to thereby rotate the crankshaft. Therefore, the engine may be equipped with a common rail fuel injection system.

Each of the combustion chambers communicates with an intake manifold and an exhaust manifold by means of intake and exhaust valves, respectively, that are driven by a camshaft synchronized with the crankshaft.

The intake manifold system, through which fresh air is admitted in the engine, may comprise an airflow sensor, a turbocharger and possibly an intercooler. The exhaust manifold forms an exhaust system of the engine and may be provided with a diesel particulate filter (DPF) for collecting or trapping particulate matter in the exhaust gas. The exhaust side may further include an exhaust gas recirculation (EGR) circuit with an EGR valve arranged in order to allow re-circulating part of the exhaust gases into the intake manifold so as to lower the combustion temperature and hence reduce generation of nitrogen oxides (NOx).

Referring more specifically to the injection system, a fuel injector and, for the needs of the present invention a cylinder pressure sensor, are associated with the combustion chamber of each of the cylinders. A fuel injector conventionally comprises a valve group operated by a solenoid or piezoelectric actuator, for injecting fuel directly into the combustion chamber. The cylinder pressure sensor is provided to measure a pressure inside the cylinder (in-cylinder pressure). As it is known in the art, the common rail is supplied with high-pressure fuel fed under pressure in succession from a fuel pump so that high-pressure fuel is accumulated within the common rail at a pressure corresponding to a desired injection pressure. The respective injectors are connected through high-pressure fuel pipes to the common rail serving as an accumulator pipe. The common rail is provided with a fuel pressure sensor, which detects a fuel pressure (common rail pressure) in the common rail so that an initial pressure of the fuel injected from the respective injectors can be monitored as needed.

Engine operation is effected by controlled operations of the intake and exhaust valves and of the fuel injectors, in accordance with pre-determined, regular combustion modes; a desired quantity of fuel is injected in succession into the respective cylinders. More specifically, while the engine is running, valve-opening operation of the intake valves causes the intake air to be introduced from the intake manifold into the combustion chambers of the respective cylinder. The thus introduced intake air is mixed with fuel supplied by injection from the injectors and a fuel-air mixture is produced, which will be compressed by pistons within the cylinders to cause ignition (compressed self ignition) and burning or combustion. After combustion, valve-opening operations of the exhaust valves allow exhaust gas to be discharged into the exhaust manifold.

The engine further includes an engine control unit ECU that dominantly performs engine control as described above. The ECU receives outputs (detection signals) from various sensors including those sensors described above and an accelerator sensor for detecting the amount of actuation of an accelerator pedal by the driver. The ECU determines running conditions of the engine and a driver demand based on the detection signals from the various sensors, and controls operations of various actuators including the fuel injectors in accordance with the determined engine running conditions and user's desire, so as to perform various controls on the engine according to prescribed rules.

As regards fuel injection, the ECU calculates a fuel injection quantity based on the various sensor signals and, on the basis of the calculated fuel injection quantity, controls the engine torque generated through combustion of the fuel in the engine. More specifically, the ECU calculates a fuel injection quantity based on an amount of actuation of the accelerator pedal (reflecting a torque request) together with injection timing appropriate for the current engine running conditions and outputs to each respective injector an injection control signal giving instructions to perform fuel injection with the calculated fuel injection quantity and at the calculated injection timing. With this fuel injection, the output torque of the engine is controlled to assume a target value on the basis of the amount of operation (for example, valve opening time) of the injector. Since the diesel engine performs compression self-ignition combustion, the throttle valve (intake throttle valve) disposed in the intake passage is normally held in a position (for example, in a full-open state) to provide a constant valve opening. Thus, combustion control of the engine is performed mainly by control of the fuel injection quantity.

As already explained in the background section, it is now conventional to operate a multi-stage injection in one engine combustion cycle (or work cycle) which comprises a main injection conducted to generate an output torque, and one or more sub-injections with a smaller injection quantity than the main injection. Actually, over most of the engine operating range, the injection pattern for one combustion cycle will include one main injection and two pilot injections, i.e. injections of small quantities before the main injection.

In order to perform an injection event for a given combustion cycle, various parameters representing engine running conditions, e.g. an engine rotational speed (average rotational speed), engine load, air flow and temperature, etc. are read in the ECU. The ECU determines an injection pattern on the basis of the various engine running condition parameters read and on the amount of actuation of the accelerator pedal by the driver.

The injection pattern is generally obtained from one or more maps (and/or mathematical formula, where appropriate) stored in advance in the ECU. More specifically, an injection pattern is preset for each of the various previously assumed engine running conditions, as determined by experiments/calibration. These engine calibration maps stored in the ECU are normally defined and/or programmed to operate an optimum combustion at a given engine operating point, and are herein referred to as the regular combustion modes.

The stored maps then include fuel injection parameters such as the number of injection stages (number of injections per combustion cycle), injector open time (pulse width—PW), and injection timings. In the case of a multistage injection, a total injection quantity of the individual injections may be variably set in accordance with a desired torque. Based on the injection pattern, a command signal is set for the fuel injectors, in order to operate a corresponding opening of the injector valve group.

As mentioned before, part-to-part variation and injector ageing affect the fuel injector flow performance. This implies that when a control signal of same pulse width is applied to different injectors (for a same rail pressure), they are likely to deliver different fuel quantities. Strategies for defining injector specific flow characteristics have been mentioned in the background art section.

Figure 1:
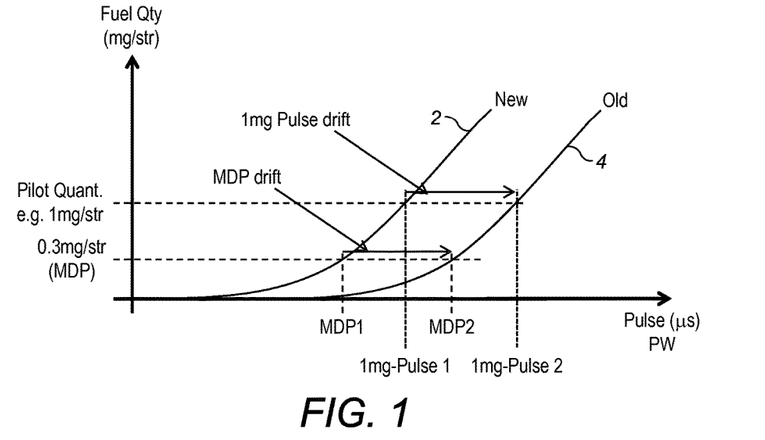
FIG. 1 is a graph showing the flow curves (fuel vs. pulse width) for a new injector and an old injector.

Also, considering an individual fuel injector, its flow characteristic will be modified with time. FIG. 1 illustrates the injector ageing phenomenon. Curve 2 illustrates the foot of a new injector's flow curve. A first remarkable point is the minimum delivery pulse MDP. This point is conventionally defined as the PW for which the smallest fuel injection occurs. Here the MDP is set by definition as the PW for which a fuel quantity of 0.3 mg is delivered (a lower value could be used, depending on the detection capability).

With time, as shown by curve 4 corresponding to an aged injector, the MDP tends to shift/drift to the right, i.e. a larger PW must be applied to deliver the same minimum fuel quantity. It is thus desirable to detect the MDP in order to appropriately correct fuel injection strategies.

Although some strategies consider that the whole injector flow curve can be translated by an amount corresponding to the difference between the two MDP values, it has been observed that for aged fuel injectors, the gradient of the flow curve may also vary. This is also illustrated in FIG. 1, where one can observe that curve 2 is slightly steeper than curve 4. Hence, it would be desirable to determine, in addition to the MDP, some characteristic points of the aged flow curve for better accuracy in the fuel injection. Indeed, the accuracy of small fuel injections is crucial for the efficiency of pilot fuel injections, which are designed to avoid knocking.

Figure 2:
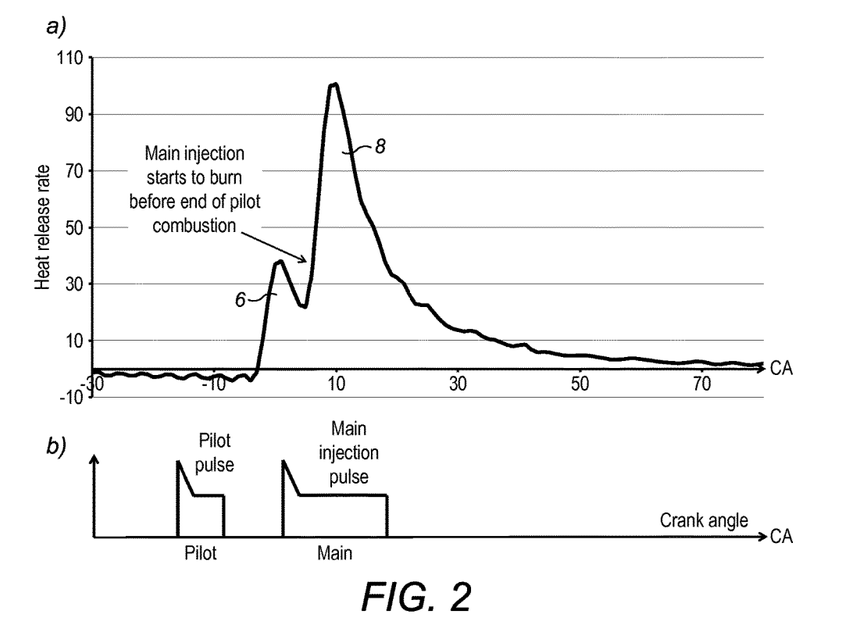
FIGS. 2 and 3 are graphs showing a) the combustion peaks according to conventional injection patterns (Heat Release rate vs. crank angle plot) and b) the corresponding logic signals controlling the injector on-time.
Figure 3:
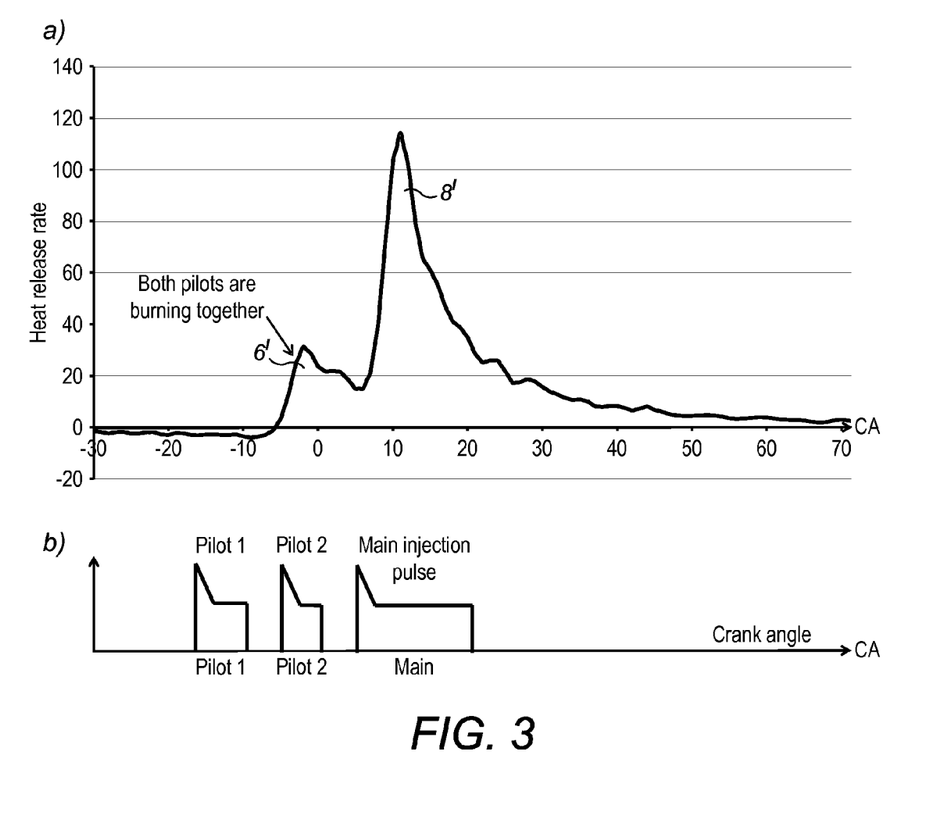

While US 2009/0292447 describes the closed loop monitoring of the pilot injected quantities based on cylinder pressure, this approach is not applicable to modern injection strategies as shown in FIGS. 2 and 3. In both Figs, the injector control pulses are shown below a plot of the corresponding rate of heat release (HR rate) for the combustion cycle. As can be seen, combustion of the pilot(s) and main fuel quantities, represented respectively by peaks 6, 6' and 8,8', is generally overlapping, so that it is not possible to measure the heat contribution of the first pilot injection alone.

It may be noted that the determination of the heat release rate from the in-cylinder pressure, and hence the plotting of FIGS. 2 and 3, is largely known in the art and will therefore not be described in detail. A possible formula for determining the rate of heat release is however given for the sake of exemplification:

$$\frac{dQ}{d\vartheta} = \frac{1}{(k-1)}\left(kP\frac{dV}{d\vartheta} + V\frac{dP}{d\vartheta}\right)$$

which can be simplified as:

$$\frac{dQ}{d\vartheta} = c_1 P + c_2 \frac{dP}{d\vartheta}$$

with $$c_1 = \frac{k}{(k-1)}\frac{dV}{d\vartheta}$$

and $$c_2 = \frac{V}{(k-1)}$$

and where:
Q: is the heat released by the combustion;
P: is the measured in-cylinder pressure;
θ: is the crank angle (in degrees);
V: is the volume of the combustion chamber;
k: is the polytropic coefficient.

As it is also very clear to those skilled in the art, the integration of the heat release rate over the corresponding crank angle gives the released heat (or amount of heat release), which reflects the injected/combusted fuel quantity.

The method of the present invention proposes a specific procedure for learning injector flow points (characteristic points) that has been particularly developed for small quantities. Whereas the method described in US 2009/0292447 is considered inapplicable in practice and proposes a closed loop monitoring of the pilot injection under regular, optimum injection patterns, in the present method injector flow points are learned during a learning procedure where the injection pattern is different from the regular injection pattern (corresponding to optimized regular combustion modes).

Provided a number of enabling conditions are met, the present learning procedure is entered. The objective is thus to learn an injection parameter associated with a nominal fuel quantity of a pilot injection, e.g. the pulse width required to inject a given fuel quantity corresponding to a small injection. The small/minutes injections performed in the present method for learning purposes are referred to as learning pilot injections, be it for the learning of pilot injections or for the MDP. The learning procedure then generally employs the following measurement routine: performing a learning pilot injection based on a candidate value for the injection parameter to influence injection of the nominal fuel quantity; and determining a parameter indicative of the actually injected fuel quantity based on the in-cylinder pressure during combustion of said learning pilot injection/quantity.

It is to be appreciated that the learning pilot injection is operated such that combustion thereof is complete before the next combustion starts (in same engine work/combustion cycle), and preferably before compression Top Dead Center (TDCC). This allows taking into account essentially the entire combustion event of the learning pilot injection when determining the parameter indicative of the actually injected fuel quantity based, without interference from other combustions.

The measured parameter indicative of the actually injected fuel quantity may then be compared to a target value or range. A decision can be taken on updating or correcting at least one injection parameter based on the result of this comparison. In case the measured fuel parameter indicative of the actually injected fuel quantity is not on target, the measurement routine may be repeated with another candidate value for the injection parameter, typically until the measure is on target.

In practice, the learning pilot injection is advantageously performed during a predetermined time window referred to as "learning window" (generally expressed as crank angle (CA) interval) that will also serve as the window for the pressure measurement and over which the amount of heat release will be calculated. This learning window is set so that, within one engine work cycle, it only encompasses (surrounds) the pilot combustion. The pilot injection parameters are selected so that the combustion of the learning pilot quantity is complete during the learning window.

It may be noticed that in order to perform the present method, the learning pilot injection is carried out under specific conditions, i.e. earlier than pilot injections performed in normal combustion modes, to ensure a complete burning of the learning pilot injection before a further combustion starts. Therefore, an injection-learning mapping is stored that defines the timing of the pilot and main injections, and possibly of a second pilot injection (or pre-main), during the learning procedure. This learning mapping is preferably calibrated so that the various learning pilot amounts can be monitored while the learning scheme is not sensible to the driver. Therefore, the main injection may be adapted as compared to a regular injection pattern, to compensate for the early learning pilot. Hence, the timing and quantities of pre-main and main injections may thus be adapted, as compared to the regular combustion modes, to provide an equivalent torque level, improving driveability.

Figure 4:
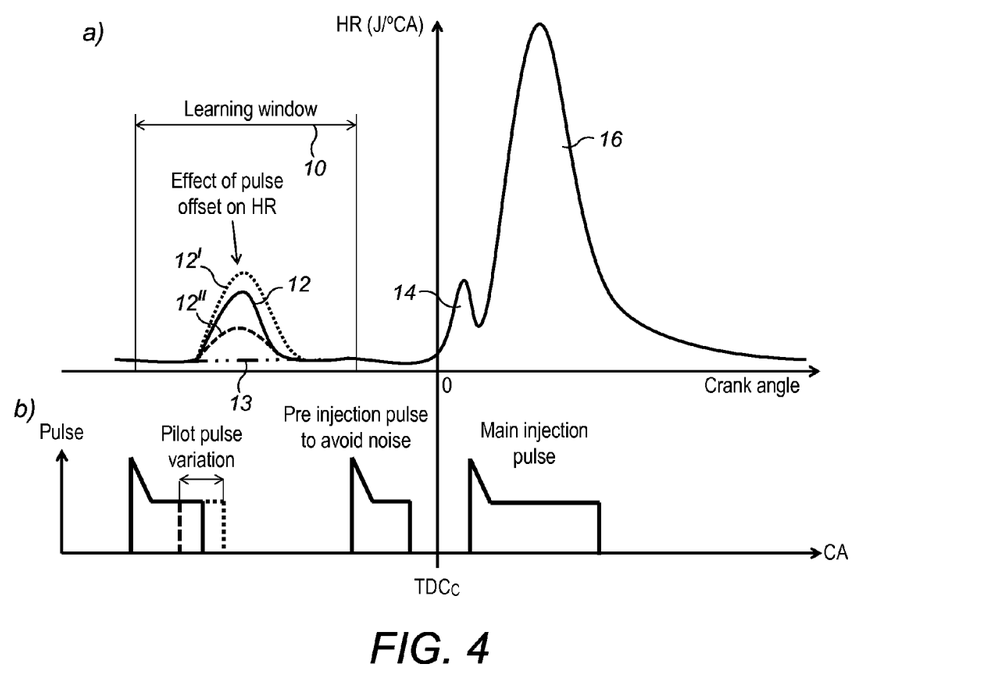
FIG. 4 is a graph illustrating the principle of the present invention, including a) the combustion peak of the pilot injection in the learning window and the pre-injection and main pulses (in a heat release rate vs. CA plot) and b) the corresponding logic pulses.

The learning window is indicated 10 in FIG. 4, with its angular extent. As can be seen, the learning window is positioned in advance, ahead of the main injection and of the optional 2nd pilot injection. The combustion of the pilot occurs entirely within the learning window, and the timing (in terms of CA position) of the pilot injection is thus generated accordingly.

It may be noted that the learning window is positioned before combustion top dead center (TDCC), and, as it will appear to those skilled in the art, relatively early as compared to regular (optimized) combustion modes.

As will be understood from FIG. 4, the pilot combustion peak 12 is more important with larger injected fuel amounts (peak 12'), and smaller when the injected fuel amounts decreases (peak 12"). Integrating the area under the combustion peak 12 gives the amount of heat release, which is commonly used to reflect an injected fuel quantity. Reference signs 14 and 16 indicate the combustion of the 2nd pilot injection (pre-main) and main injection, respectively.

Hence, when a given learning injection is performed in the learning window 10—for a known fuel quantity and set of injection parameters (typically PW and rail pressure Prail)—the in-cylinder pressure information over the learning window allows computing a parameter indicative of the injected fuel quantity, here preferably the rate of heat release, and then the corresponding amount of heat release.

The expected "target amount" of heat release can be readily determined for the nominal injected fuel quantity, whereby one may compare the measured heat release with the "target amount" and take the decision that the injected amount was correct, or updating or correcting an injection parameter (e.g. the pulse width) based on said comparison. If the measured heat release is not on the target amount (or range), other injections can be performed by modifying at least one injection parameters in order to obtain converging values. The modified injection parameter, e.g. the corrected PW or a correction factor for the PW, may then be stored in association with the requested (nominal) fuel quantity.

Preferably, the calculation of the parameter indicative of the injected fuel quantity (here the amount of heat release) takes into account the pressure baseline in the learning window, as measured in an engine work cycle preceding the engine work cycle during which the learning pilot is injected (see line 13 in FIG. 4). This thus consists in measuring the pressure over the learning window, without combustion in said learning window. Such pressure baseline is typically determined at the start of the learning scheme. This provides a baseline heat amount that reflects the heat losses through cylinder walls at the specific operating point.

Also, a similar zero injection baseline pressure measurement (ending pressure baseline) over the learning window (without combustion therein) may be carried out after the learning pilot injections, to check the stability of the operating point. A matching of the starting and ending baseline measurements allows validating the learned values.

A preferred learning routine will now be described with respect to FIGS. 5 and 6, which describe the learning of the pulse width corresponding to a nominal pilot injection, in this example 0.5 mg.

The routine starts once enabling conditions are met. This is preferably the case when the engine is warm (e.g. engine coolant temperature above 50° C.) and the EGR rate is low, e.g. below 30% and preferably not more than 10%. Also, the engine should preferably operate at a speed in the range from 1 000 to 3 500 RPM.

When enabling/learning conditions are met, the routine may start at box 20, where the in-cylinder pressure is measured over the learning window without pilot fuel injection, nor combustion in the window (zero level). This provides the starting baseline pressure and heat amount. This is illustrated by section a) of FIG. 6, where three measurements (on 3 combustion cycles) of the starting pressure baseline are represented. The injection command signal is zero (PW=0) and the corresponding heat release values are below 0.

Once a starting baseline pressure or amount is determined, the routine moves to box 30. Here, the pilot injection is carried out with a starting pulse width PW1 (1st candidate value), as e.g. read by the ECU from existing tables. The heat release amount (HR) corresponding to the injected fuel quantity is calculated from the measured in-cylinder pressure. In the example of FIG. 6, 3 pilot injections (sectional) where performed in three combustion cycles, and the calculated amount of heat release (here the average of the 3 HR values) is above the expect target value of 20 Joules, corresponding to 0.5 mg of fuel.

In case the measured HR is not on target (i.e. either above or below), the routine jumps to box 40, where a further injection run is performed at another pulse width PW2 (2nd candidate value) different from PW1. PW2 is preferably an offset value of PW1 determined so that the target range is surrounded. The result is shown in FIG. 6, section b2, where one can see that the 3 pilot injections have produced 3 HR values below the HR target.

Since the target is not met, the routine moves to step 50, according to which a further run is performed with an injector pulse width PW3 (3rd candidate value) that is preferably determined as an interpolated value between the previous values PW1 and PW2. Again, the HR corresponding to the respective pilot pulses is computed. In the example of FIG. 6, the resulting HR points are now on target (i.e. in the target range), and the value PW3 then corresponds to the appropriate pulse width for injecting the nominal fuel value of 0.5 mg.

Figure 6:
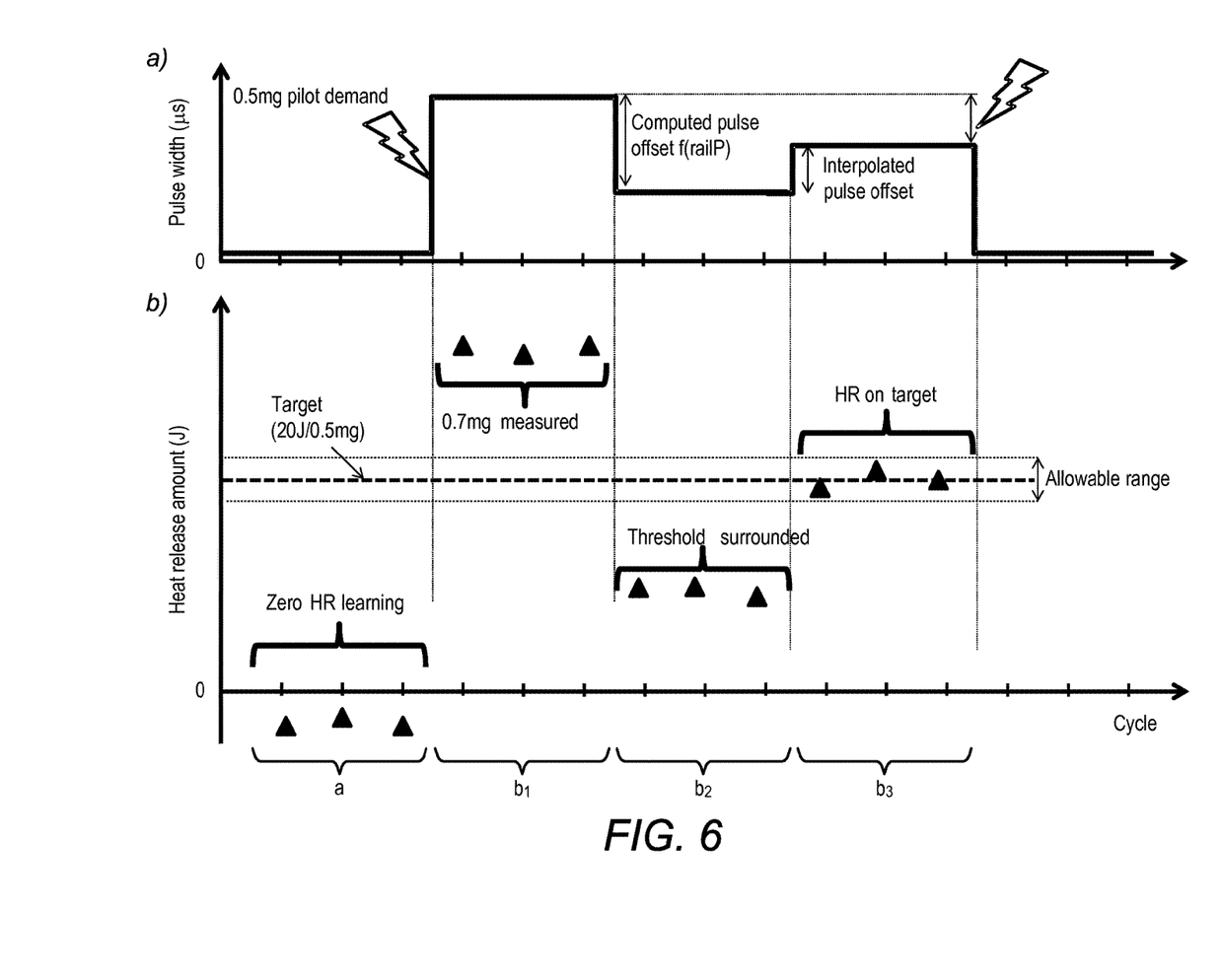
FIG. 6 comprises a) a graph showing the pulse width for a series of combustion cycles as controlled by the learning scheme of FIG. 5, and b) the resulting values of heat release.

As can be grasped from FIG. 6 also, as soon as the calculated HR values meet the target, the routine proceeds to box 60, where the ending pressure baseline and corresponding HR is determined, and in case the ending conditions match the starting conditions (determined at 20), the learned values are validated. The measure of the ending pressure baseline is not shown in FIG. 6.

Hence, in the example of FIG. 6, the candidate value PW3 is learned as the command pulse width required for injecting the nominal fuel quantity of 0.5 mg. It may be stored as such in a flow vs. PW map, or a correction factor can be learned e.g. as the difference between PW3 and the nominal PW stored in the reference flow map vs. the nominal amount 0.5 mg.

The following can be noted as regards preferred implementation aspects of the present method. Conventionally, the ECU stores a flow map defining the fuel quantity in function of rail pressure Prail and pulse width PW. This flow map is normally not changed during engine operation. Therefore possible PW corrections are preferably stored in an injector specific PW correction map, either as absolute value or correction value or factor, similarly in function of fuel quantity and Prail. Let us suppose that to inject a nominal fuel quantity Xa with a rail pressure Pa, the flow map gives a pulse width PWa, and the PW correction map gives a correction value ΔPWa. Then the corrected pulse width for injection of fuel quantity Xa used by the ECU corresponds to PWa+ΔPWa.

Now the present invention provides a method of determining these correction values for the PW correction map. Referring to the example of FIG. 6, the initial value PW1 (section b1) would be the value as simply read from the flow map—supposing corresponding value in the PW correction map is zero. At the end of the learning routine, PW3 has been determined as the correct pulse width to inject the nominal fuel quantity of 0.5 mg, and the PW correction map can be updated by storing the correction value PW3−PW1 for the corresponding nominal fuel quantity and Prail.

Figure 5:
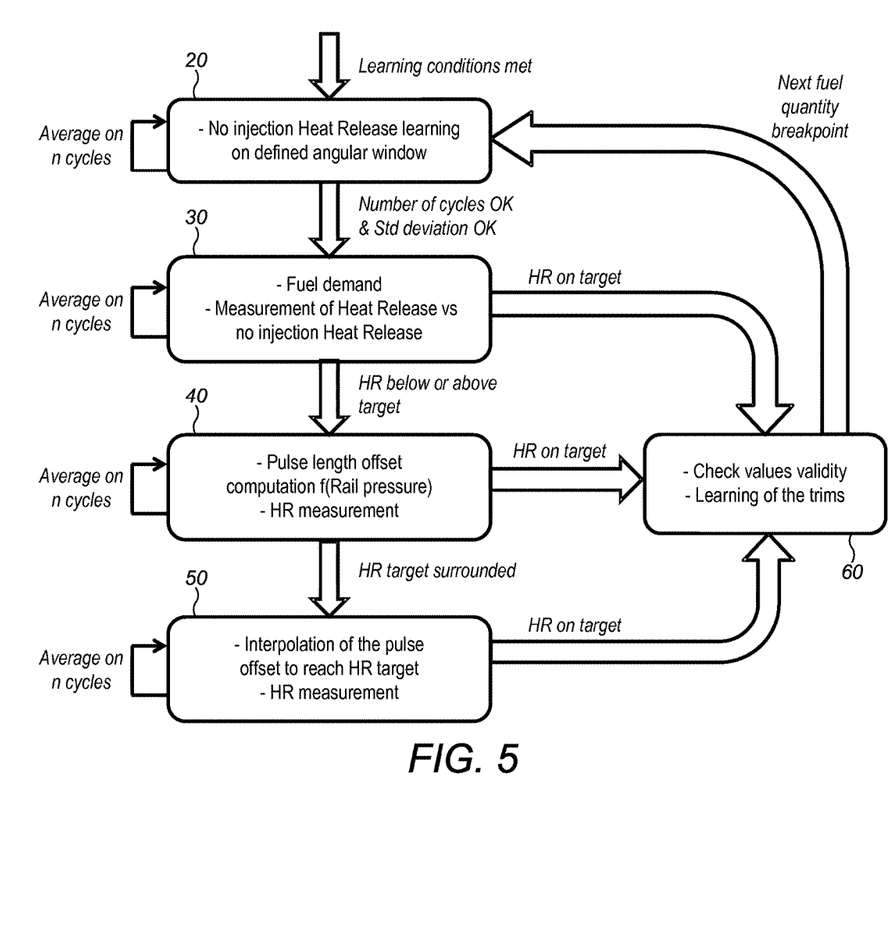
FIG. 5 is a flowchart illustrating a preferred learning scheme in accordance with the present method.

For an improved operation of the learning mode, one or more of the following aspects may be predefined as rules or maps, or any other appropriate measure, and stored in the ECU:

the number of engine work cycles required for determining the cylinder pressure based parameter indicative of the actually injected fuel quantity. As indicated in FIG. 5, this parameter, respectively the amount of heat release may be an average value computed over a number of engine work cycles.

a mapping for converting the nominal fuel quantity (e.g. in mg) into a corresponding nominal amount heat release (e.g. in Joules), preferably in function of the engine operating point (speed/load) as well as engine and air temperatures.

an injection learning mapping, as mentioned above, defining the timing of the learning pilot injections, with possible corrections, depending on the engine operating point (speed/load), Prail and boost pressure. The learning mapping also defining the timing of the main injections depending on the engine operating point so that the main combustion occurs outside the learning window, and a possible correction factor for the main injection to compensate for the early learning pilot injection. The learning mapping may further define the timing and fuel quantities of the second pilot (pre-main) to be outside the learning window and depending on the amount of learning pilot injection.

in the case of the learning routine illustrated in FIG. 5, a mapping may be used to define the offset applied to the first candidate PW1 value to determine the second candidate value PW2, when the target is not met at step 30. This mapping is preferably dependent on Prail.

a maximum standard deviation is preferably set to define the target range around the nominal fuel value, respectively around the corresponding nominal amount of heat release.

a map defining a maximum pulse width variation with respect to the previously learned PW value, depending on Prail and on the time elapsed since this previously learned PW value was actually updated. This allows detecting a too rapid injector drift.

a scheduler function may be used to control the learning of the injection parameter for various pilot fuel quantities, including the minimum delivery pulse, in a predetermined sequence, and for various rail pressures. Such scheduler can be programmed to prioritize learning of extremum nominal fuel values, say the MDP and largest pilot quantity to be learned, so that until all values are learned, non-learned intermediate values can be interpolated, e.g. using linear regression.

The invention claimed is:

1. A method of operating an internal combustion engine comprising at least one cylinder equipped with a pressure sensor, wherein, said engine is operated in an injector learning mode, in which an injection parameter associated with a nominal fuel quantity of a pilot injection is learned based on the following measurement routine: performing a learning pilot injection based on a candidate value for said injection parameter to influence injection of said nominal fuel quantity and determining a parameter indicative of the actually injected fuel quantity based on the in-cylinder pressure during combustion of said learning pilot injection; characterized in that said learning pilot injection is operated at an early timing in a combustion cycle such that combustion thereof is complete before the next combustion starts within the same combustion cycle; and said determination of the parameter indicative of the actually injected fuel quantity based on the in-cylinder pressure takes into account an entire combustion event of said learning pilot injection, comprising a preliminary step of measuring the in-cylinder pressure over a predetermined learning window during an engine working cycle without learning pilot injection, in order to determine a starting baseline pressure; and the determination of the parameter indicative of the injected fuel quantity for an actual fuel injection takes into account said starting baseline pressure and correcting a subsequent injection based on the parameter indicative of the actually injected fuel quantity.

2. The method according to claim 1, wherein
said parameter indicative of the actually injected fuel quantity is compared to a target value or range; and
if said parameter indicative of the actually injected fuel quantity is on said target value or range, then said candidate value is used to update or validate said injection parameter; otherwise said measurement routine is repeated with a different candidate value for said injection parameter.

3. The method according to claim 1, wherein each learning pilot injection is calibrated so that the entire combustion thereof occurs within the predetermined learning window before TDCC without other combustion in said predetermined learning window; and the measure of the in-cylinder pressure is effected over said predetermined learning window.

4. The method according to claim 3, wherein said predetermined learning window has a predetermined width, and is positioned in the range between −35° and 0° CA; and said predetermined learning window has an angular width of up to 20° C.A.

5. The method according to claim 3, comprising a final baseline step of measuring the in-cylinder pressure over said predetermined learning window during an engine working cycle without learning pilot injection in order to determine an ending baseline pressure, after said learning pilot injection(s).

6. The method according to claim 5, wherein an injection parameter is learned, updated or corrected based on a comparison between the parameter indicative of the actually injected fuel quantity and a target threshold or range, only if said starting and ending baseline measurements are the same.

7. The method according to claim 1, wherein the following scheme is performed for each pilot injection to be learned:
   b1) performing a learning pilot injection with a first candidate value for said injection parameter in one or more respective engine work cycles and determining the corresponding pressure-based parameter indicative of the actually injected fuel quantity, and comparing the latter to a target value or threshold associated with said nominal fuel quantity;
   in case said comparison is not on target:
   b2) performing a learning pilot injection with a different, second candidate value for said injection parameter in one or more respective work cycles and determining the corresponding pressure-based parameter indicative of the actually injected fuel quantity, and comparing the latter to said target value or threshold;
   in case said comparison is not on target after completing step b2:
   b3) performing a learning pilot injection with a third candidate value for said injection parameter, interpolated based on said first and second candidate values, in one or more respective work cycles and determining the corresponding pressure-based parameter indicative of the actually injected fuel quantity, and comparing the latter to said target value or threshold;
   wherein as soon as a comparison is on target, the corresponding candidate value is used for learning said injection parameter in association with said nominal fuel quantity.

8. The method according to claim 1, wherein said parameter indicative of the injected fuel quantity is or is based on the amount of heat release corresponding to said pilot injection, respectively as determined over a predetermined learning window.

9. The method according to claim 1, wherein said injection parameter to be learned corresponds to a pulse width of an injector control signal.

10. The method according to claim 9, comprising a mapping defining a maximum pulse width variation with respect to a previously learned pulse width value or correction, depending on rail pressure and on the time elapsed since this previously learned pulse width value or correction was actually updated, in order to detect a too rapid injector drift.

11. The method according to claim 1, wherein said enabling conditions are met when one or more of the following is/are present:
   said engine is warm, having reached a temperature of at least 50° C.;
   the current EGR rate is not more than 30%;
   the engine is in a speed range between 1000 and 3500 RPM.

12. The method according to claim 1, wherein a scheduler function controls the learning of said injection parameter for various pilot fuel quantities, including a minimum delivery pulse, in a predetermined sequence, and for various rail pressures.

13. The method according to claim 1, wherein said measurement routine is carried out in a foot-off phase, and the learning pilot injections are performed in respective work cycles only with said pilot injections; or said measurement routine is performed in a foot-on phase, wherein a learning pilot injection is followed by a main injection with an intermediate pre-main injection, wherein the main injection and pre-main injection are operated in function of the learning pilot injection in such a way that the same torque is delivered at the current engine speed/load operating point, as if the engine was not operated in said learning mode.

\* \* \* \* \*